United States Patent
Aluru et al.

(10) Patent No.: US 12,361,591 B2
(45) Date of Patent: Jul. 15, 2025

(54) PRECISE INTRINSIC CALIBRATION OF VEHICLE CAMERA

(71) Applicant: GM GLOBAL TECHNOLOGY OPERATIONS LLC, Detroit, MI (US)

(72) Inventors: Sai Vishnu Aluru, Commerce Township, MI (US); Michael Dominic Done, Addison Township, MI (US); Michael Cervoni, Lake Orion, MI (US); Syed Mahdi, Hazel Park, MI (US); Aadi Kothari, Princeton, NJ (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 18/494,150

(22) Filed: Oct. 25, 2023

(65) Prior Publication Data

US 2025/0139828 A1    May 1, 2025

(51) Int. Cl.
*G06T 7/80*   (2017.01)
*G06T 5/92*   (2024.01)
*G06T 7/13*   (2017.01)

(52) U.S. Cl.
CPC .............. *G06T 7/80* (2017.01); *G06T 5/92* (2024.01); *G06T 7/13* (2017.01); *G06T 2207/20036* (2013.01)

(58) Field of Classification Search
None
See application file for complete search history.

(56) References Cited

U.S. PATENT DOCUMENTS

| | | | |
|---|---|---|---|
| 2013/0033596 A1* | 2/2013 | Crothers | G01B 21/045 |
| | | | 382/206 |
| 2018/0268237 A1* | 9/2018 | Stanimirovic | G06T 7/248 |
| 2019/0121427 A1* | 4/2019 | Qin | G06F 3/013 |
| 2021/0380182 A1* | 12/2021 | DeLizo | B60L 53/16 |

OTHER PUBLICATIONS

Xiang, Lan, Zhang; 2012 Fifth International Conference on Intelligent Computation Technology and Automation; A Grid Recognition-Based Calibration Algorithm for Measuring System; downloaded on Jun. 12, 2024 at 12:16:04 UTC from IEEE Xplore.

Joshi, Szeliski, Kriegman; PSF Estimation using Sharp Edge Prediction; downloaded on Jun. 14, 2024 at 12:16:04 UTC from IEEE Xplore.

(Continued)

*Primary Examiner* — Tyler W. Sullivan
(74) *Attorney, Agent, or Firm* — Quinn IP Law (57) ABSTRACT

Aspects of the present disclosure include methods, apparatuses, and vehicles for performing intrinsic calibration of the cameras in the vehicle. A processor may acquire plural images of a target captured by the camera at different locations. For each image, the processor may tone map the image, binarize the tone-mapped image, define a structuring element based on the digital form of the shape of the target, perform morphology on the image to align and calibrate the structuring elements, filter the target and modify each of the other pixels to black, and compile an output image. Based on the calibration, the principal point values may be shifted to account for discrepancies and store calibrated values in each camera.

20 Claims, 7 Drawing Sheets

(56) References Cited

OTHER PUBLICATIONS

Yeong, Velasco-Hernandez, Barry, Walsh; Sensor and Sensor Fusion Technology in Autonomous Vehicles: A Review; Sensors 2021, 21, 2140; pp. 1-37.

Arca, Casiraghi, Lombardi; Corner Localization in Chessboards for Camera Calibration; Proceedings of International Conference on Multimedia, Image Processing and Computer Vision (IADAT-micv2005). 2005.

* cited by examiner

| Calibration Method | Morphological Process | S/N | Output Image Size[pix] | | Calibrated Parameter | |
|---|---|---|---|---|---|---|
| | | | | | Camera Parameter with Distortion Focal Length[pix] | |
| | | | Width | Height | fx | fy |
| Min Value for 21 Patterns Shooting | | | - | - | - | - |
| Max Value for 21 Patterns Shooting | | | - | - | - | - |
| Updated Method of 21 Patterns Shooting | Before | X1 | 3840 | 1920 | 2570.235444 | 2569.049583 |
| | After | | 3840 | 1920 | 2587.884418 | 2586.757884 |
| | Before | Y1 | 3840 | 1920 | 2578.956396 | 2576.571924 |
| | After | | 3840 | 1920 | 2589.076312 | 2586-770295 |
| | Before | Z1 | 3840 | 1920 | 2570.920312 | 2568.442339 |
| | After | | 3840 | 1920 | 2587.532115 | 2585.091748 |

| Calibrated Parameter | | | | | | | | | | |
|---|---|---|---|---|---|---|---|---|---|---|
| Camera Parameter with Distortion | | | | | | | | | | |
| Principal Point[pix] | | Distortion Coefficient | | | | | | | | |
| cx | cy | k1 | k2 | k3 | k4 | k5 | k6 | p1 | p2 | |
| - | - | - | - | - | - | - | - | - | - | |
| - | - | - | - | - | - | - | - | - | - | |
| 1927.133373 | 975.459267 | -0.314208079 | 0.143253642 | -0.041605398 | - | - | - | 4.07484E-05 | 0.000255446 | |
| 1925.363526 | 974.1697228 | -0.314934038 | 0.143600681 | -0.041795798 | - | - | - | 7.52413E-05 | 0.000330402 | |
| 1925.970765 | 983.9342646 | -0.314902755 | 0.144167152 | -0.042307697 | - | - | - | -0.000167227 | 4.49328E-05 | |
| 1923.116698 | 979.5807552 | -0.315291666 | 0.144404359 | -0.042494316 | - | - | - | -7.57098E-05 | 0.000117232 | |
| 1923.510958 | 977.7591293 | -0.314384055 | 0.143351377 | -0.041682765 | - | - | - | -5.3195E-05 | -8.83264E-05 | |
| 1921.647722 | 980.2943471 | -0.315102772 | 0.143732252 | -0.041913331 | - | - | - | -0.000102648 | -2.16776E-05 | |

PRECISE INTRINSIC CALIBRATION OF VEHICLE CAMERA

INTRODUCTION

This disclosure is generally directed to interior and exterior vehicle-based and other cameras, and more particularly to intrinsic calibration of such cameras. The intrinsic calibration of a camera is paramount for use in computer vision applications. These applications include, for example, calculating distances between objects and estimating the respective sizes of those objects based on the images captured by the cameras. Intrinsic calibration involves calibrating the camera's internal parameters such as focal length, principal point, and distortion coefficients. Intrinsic calibration is significant for computer vision applications because, as noted, accurate focal lengths and principal points are needed for accurately calculating distances and sizes of objects. With respect to the simple example of a camera supplier providing cameras to an automobile manufacturer for use in vehicles, there is currently a lack of precision in intrinsic calibrations provided by the supplier. These failures cause sensor alignment errors on a higher scale, meaning that magnitudes of error relating to objects, distances, and sizes become more pronounced when the cameras are not properly calibrated.

SUMMARY

Aspects of the disclosure consequently address these and other deficiencies in the art. Most notably, adding imaging morphology to calibration target imagery is a unique addition to the process of intrinsic calibration. For example, incorporating a chronological morphological process into the target image count allows the cameras to provide a more precise and reliable intrinsic calibration, while concurrently making it simpler to detect and monitor material changes in the target image with greater detail. A higher order of resolution may be achieved, and the overall distances between objects and their respective individual sizes may be relied on as more accurate than using existing approaches.

In one aspect of the disclosure, an apparatus for intrinsic calibration of a camera includes memory (which may be defined as multiple different memory structures, such as cache memory, dynamic ram (DRAM), and non-volatile memory) for storing images and executable code, and an image processor (which may include one or more general-purpose processors or one or more dedicated image processors, etc.) coupled to the memory. The image processor is configured to acquire, for storage in the memory, plural images of a target captured by the camera at different locations. Also, for each of the plural images, the image processor is configured to tone map the image to improve black and white image levels, binarize the tone-mapped image, define a structuring element based on the digital form of the shape of the target, perform morphology on the image to align and calibrate the structuring elements, filter the target and modify the other pixels to black, compile an output image including the filtered target, determine intrinsic values using the compiled output images, shift principal point upon intrinsic calibration using targets, and store new shifted principal points in the memory.

In another aspect of the disclosure, a method for intrinsic calibration of a camera includes acquiring, by an image processor for storage in a memory, plural images of a target captured by the camera at different locations for a predetermined number of times and acquiring a horizontal field-of-view (HFOV) and a vertical field-of-view (VFOV) of a lens of the camera based on imagery. The method further includes, for each of the plural images, tone mapping the image to improve black and white image levels, binarizing the tone-mapped image, defining a structuring element based on a digital form of the shape of the target, performing morphology on the image to align and calibrate the structuring elements, filtering the target imagery using the target at multiple locations, compiling an output image including the filtered target; determining intrinsic values using the compiled output images, shifting principal point upon intrinsic calibration using targets, and storing new shifted principal points in the memory.

In still another aspect of the disclosure, a vehicle includes a vehicle body having a camera mounted on an exterior portion thereof, a cabin housed within the vehicle body, a dashboard near the interior front portion of the vehicle body, a memory for storing images and executable code within the vehicle body, and an image processor coupled to the memory and configured to acquire, for storage in the memory, plural images of a target captured by the camera at different locations. The image processor is further configured, for each of the plural images, to tone map the image to improve black and white image levels, binarize the tone-mapped image, define a structuring element based on the digital form of the shape of the target, perform morphology on the image to align and calibrate the structuring elements, filter the target and modify the other pixels to black, compile an output image including the filtered target, determine intrinsic values using the compiled output images, shift principal point upon intrinsic calibration using targets, and store new shifted principal points in the memory.

In various embodiments for each of the above aspects, the apparatus, method, and vehicle are further configured to implement the following. The image processor may be configured to compute a kernel to define a structuring element for use in performing morphology, the structuring element being a digital form of a shape used for the target for use by the camera. The image processor may further be configured to identify a horizontal field-of-view (HFOV) and a vertical field of view (VFOV) based on imagery of the camera, to locate target edges for storage in the memory, to perform an edge spread function (ESF) using the found edges, to estimate a number of blur pixels based on the ESF, and to remove the blur pixels from the image. In still other embodiments, the image processor may be configured to use calibration differences before and after the calibration process to include (1) a calibration method, (2) a morphological process, (3) output pixel sizes and heights, (4) focal lengths, (5) principal points, and (6) distortion coefficients. In other embodiments, calibration parameters for the calibration method may include pixel size, focal length, principal point, and distortion coefficients. The image processor may also be configured to add intrinsic calibration to incorporate a chronological morphological process into the target image count to enable a precise intrinsic calibration and to easily detect and monitor changes in the target image with high detail.

In various embodiments, the image processor is configured to add intrinsic calibration to incorporate a chronological morphological process into the target image count to enable a precise intrinsic calibration and to detect and monitor changes in the target image with high detail. In embodiments involving self-calibration of the vehicle, the image processor and the memory are part of an electronic control system (ECU) within the vehicle body. The image processor may further be configured to incorporate shifting principal points and focal points when the calibrating ECU is part of the vehicle body.

The above summary is not intended to represent every embodiment or every aspect of the present disclosure. Rather, the foregoing summary merely provides examples of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

The appended drawings are not necessarily drawn to scale and may present a simplified representation of various features of the present disclosure, including, for example, specific dimensions, orientations, locations, and shapes. In some cases, well-recognized features in certain drawings may be omitted to avoid unduly obscuring the concepts of the disclosure. Details associated with such features will be determined in part by the particular intended application and use case environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "having," and the like shall mean "including without limitation." Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

At present, many manufacturers of vehicles, transport structures, and other heavy machinery and equipped relying on precisely equipped cameras are relegated to calibrating those vehicle or equipment individually at a dedicated location in light of the current lack of precise intrinsic calibration data from suppliers. Among other drawbacks, this individual calibration, while needed, comes at a hefty price tag involving a workload of engineers, storage for a volume of vehicles or other equipment, and overhead associated with these logistics. The incorporation of image morphology into this process is beneficial because it provides a more accurate and reliable intrinsic calibration result. These superior results make it easier to detect and track changes in the target image over time, because, for example, the morphological process may provide detailed information concerning the structure of the target image.

As noted above, the incorporation of image morphology into calibration target enables the user to modify the target image count with a chronological morphological process to improve intrinsic calibration. By incorporating a chronological morphological process into the target image count, this novel approach may provide a more precise and reliable intrinsic calibration, as well as making it simpler to detect and monitor changes in the target image with greater detail.

Figure 1:
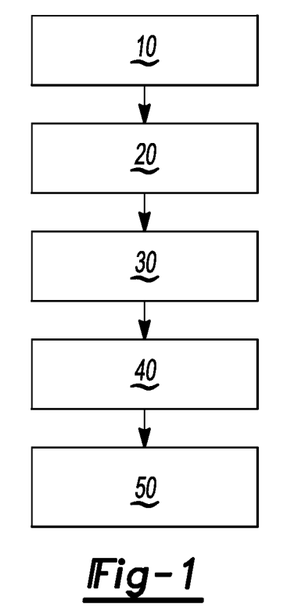
FIG. 1 is a flow diagram of an existing technique for calibrating vehicular cameras.

FIG. 1 is a flow diagram of an existing technique for calibrating vehicular cameras. As in the various figures in the present disclosure, the hardware elements that perform the intrinsic calibration functions may include a computational device set up in a location where the calibration is to be performed. For example, FIG. 10 shows an example of this configuration. In sum, except for FIG. 9, the functions generally described in FIGS. 1-10 may be performed by one or more vehicle-external image processors, which may include general purpose processors, dedicated graphics or image processors, and other complex and reduced instruction set computers. The functions in FIGS. 2-10 may also be performed partly in software and partly in hardware by one or more digital signal processors (DSPs), application specific integrated circuits (ASICs), field programmable gate arrays (FPGAs), and other circuits that may incorporate software, hardware, middleware, and firmware to carry out the functions described.

Referring back to FIG. 1, a series of intrinsic calibration steps are performed by a processing system (FIG. 10) at a location. Beginning with logic block 10, the camera to be calibrated takes a series of pictures with targets placed at different locations, positions, and distances from the camera. It should be noted that the intrinsic calibration may be performed with the camera detached from the vehicle. In other configurations, the calibration may be performed with the camera installed on the vehicle. The present disclosure is designed to encompass both scenarios. In the embodiment shown, the camera is considered to be calibrated separately for ease of handling and simplicity of calibration.

Referring next to logic block 20, the applicable processor performs intrinsic calibration. In intrinsic calibration, the calibration function may calculate the camera matrix using intrinsic parameters. The intrinsic parameters may include, for example, the optical center and the focal length of the camera, together with other parameters discussed herein. Based on the results of the intrinsic calibration process, control proceeds to logic block 30, wherein the optimized intrinsic parameters (e.g., those referenced above) are produced and temporarily cached. At that point, the optimized intrinsic parameters are flashed into the camera being calibrated. That is to say, the values are stored in the memory of the camera at logic block 40. In the final step, at logic block 50, the cameras and any associated parts may then be shipped to the manufacturer plant where the vehicle is being assembled.

Figure 2:
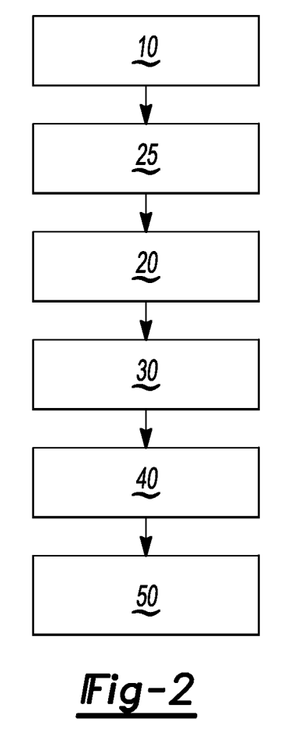
FIG. 2 is a flow diagram of a modified technique for calibrating vehicle cameras, in accordance with an aspect of the disclosure.

FIG. 2 is a flow diagram of a modified technique for calibrating vehicle cameras, in accordance with an aspect of the disclosure. As in FIG. 1, the functions performing the modified technique may be external computer components that are fixed at a location. In some configurations, the functions of FIG. 2 may be performed with the camera installed on the vehicle, although it is assumed for the purpose of this illustration that the camera is a freestanding unit received from the supplier. In yet other embodiments discussed with reference to FIG. 10, the intrinsic calibration may take place inside the vehicle, so that the cameras may easily be rebooted in the event of an electrical problem or other error that inadvertently modifies the optimal values.

Beginning at logic block 10 of FIG. 2, the targets are acquired by taking a plurality of images with the selected target being positioned at different locations relative to the lens of the camera at issue. While the number of targets may vary depending on the size and resolution of the camera at issue, and its field of view, in one configuration 10-16 targets with different positions and distances may be acquired. This number may vary depending on numerous factors.

One of the deficiencies with the pictures of targets at logic block 10 of FIG. 1 is that, ultimately, the calibration values may be off due to variances discussed further below. Accordingly, to account for those variances, the process of FIG. 2 includes performing image morphology as described in the diagrams to follow. In effect, FIG. 2 and FIG. 1 both show high level views of the general steps of intrinsic calibration but using FIG. 2 potentially dramatically increases the accuracy of the values to be optimized by using morphology and related steps in preparation thereof, as described in logic block 25.

Figure 3:
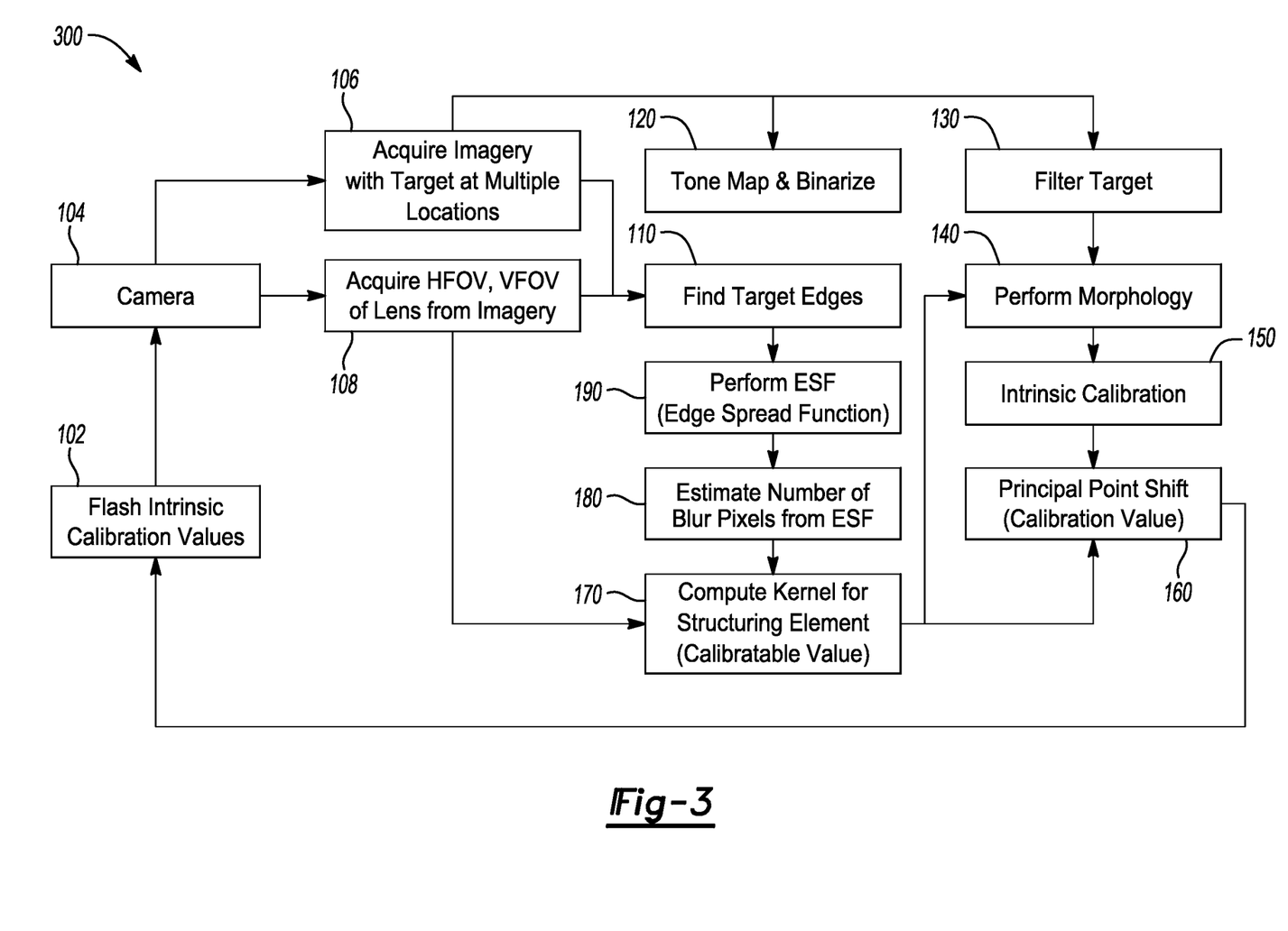
FIG. 3 is a detailed block diagram of techniques for calibrating vehicle cameras, in accordance with an aspect of the disclosure.

FIG. 3 is a detailed block diagram 300 of techniques for calibrating vehicle cameras, in accordance with an aspect of the disclosure. The camera to be calibrated in these embodiments is camera 104. From camera 104, at logic block 106 as in previous figures, the camera 104 is set to acquire images with the target placed at multiple locations, until a threshold number of images appropriate for the camera's resolution and fields of view are taken. As noted, in some embodiments, about 10-16 photographs may be acquired, although other values are possible. After logic block 106 we are left with a plurality of images with the target at the respective locations. This information may be temporarily cached in memory as the calibration process proceeds. The cached image information may be subject to a calibration process (not shown) in which the photographs from logic block 106 are calibrated using MATLAB or a similar procedure. After the image information is calibrated, it may enter into logic block 120. At logic block 120, the black-and-white levels of the images may be improved by tone mapping. Tone mapping is similar to bit-plane slicing, in which an image that is digitally represented in terms of pixels may be expressed in terms of bits. For example, where an exemplary image includes an 8-bit representation per pixel, there are eight bits for each pixel. This eight bit image is thereupon decomposed into eight one bit planes. In this example, plane 1 includes the lowest order bit of each of the pixels in the image, and plane 8 includes the highest order bit. The imagery at logic block 120 is also binarized. Image binarization is the conversion of a document image into a bi-level document image, wherein pixels are segregated into one of two values: black or white. Essentially, image binarization creates a binary black and white image from a grayscale image that may be used to define targets in an image by separating the foreground from a background.

Thereafter, once the images are tone-mapped and binarized, the method may filter for the target as shown at logic block 130. Part of the procedure of filtering for the target includes finding the target edges (logic block 110) and performing the procedure of logic block 108. That is, in addition to logic block 106, camera 104 proceeds to operations at logic block 108. These operations may entail acquiring the horizontal field-of-view (HFOV), vertical field-of-view (VFOV) of the lens based on the imagery of the camera. These parameters are useful in defining a border for the calibration, since the image from the camera will have maximum HFOV and VFOV and these measurements should be taken into account in the final calibration to increase its precision and to ensure that each of the measurements falls within the borders defined by these parameters. Thus, a principal purpose of this logic block 110 is to identify the target edges.

In an exemplary embodiment, after finding the target edges at logic block 110, the processor may perform an edge spread function (ESF) at logic block 190 using the information obtained from logic block 108 and logic block 110. The ESF describes how the image reproduces an edge, such as changing from a low to a high intensity portion of an image. Next, referring to logic block 180, the processor estimates the number of blur pixels using the information obtained from the ESF. In one configuration of blur, the pixels nearest the center of the kernel are given more weight than those farther away from the center. More simply, the blur is a process of performing a weighted average operation on an entire image. In some embodiments, the blur is removed prior to doing morphology on the image. Removing the blur excludes unnecessary target area from the imagery and limits the imagery to just the target coordinates prior to the morphology process.

Moving to logic block 170, the ESF may provide a target's dot size from the imagery being analyzed, and which is a calibratable value. A structuring element may be used to compute a kernel. Conversely, a structuring element or a structured element is the digital form of the shape used in the target. The kernel will change based on the size of the target. In various embodiments, the kernel is a calibratable value that may be transferred as a calibration value to the camera. In one example, a kernel may form a circle. Having the kernel at logic block 170 and having filtered for the target at logic block 130 and removed the blur, the processor may perform morphology at logic block 140.

Figure 4:
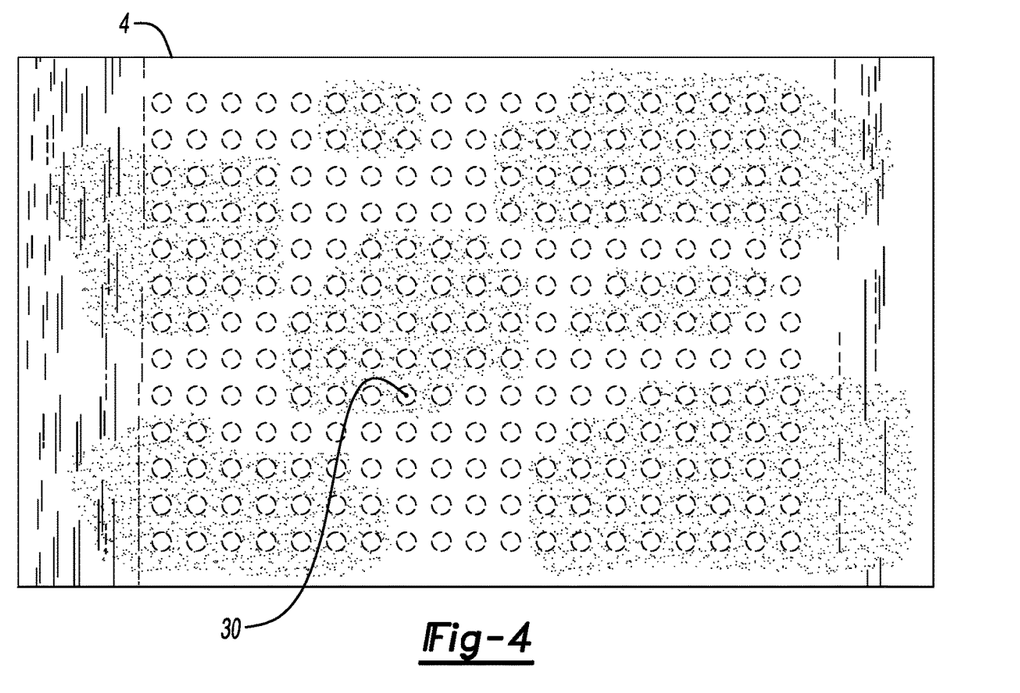
FIG. 4 is an example image representation prior to morphology, in accordance with an aspect of the disclosure.

As is evident from FIGS. 4 and 5, below, image morphology involves using the calibratable values to take each of the targets (here, shaped as circles or dots) and equalizing their size. Thus, targets that are too small are increased in size, and overly large targets are decreased. The center of the target helps determine the accuracy of the calibration of the camera. The targets may be other shapes (e.g., square, rectangular, etc.), but the principle remains the same. There are different types of morphology, and they may involve open, close, erosion and dilation. Pairs of these attributes may be used. For example, opening and dilation may be used in one technique. Closing and erosion may be used in another technique.

Once the targets are each equalized and identified, then intrinsic calibration may occur at logic block 150 in which the other pixels in the camera are converted to black, but for the targets. From the procedure, the output images may be compiled, and intrinsic calibration may continue until the final intrinsic values are determined. Thereupon, at logic block 160, the principal point shift of calibration values from initial to final may be sent to logic block 102, where they are "flashed" or read into the applicable camera. Control thereupon returns to camera 104, in which the next camera (if any) is ready for calibration. The process repeats for each of the cameras in a manner summarized according to one example embodiment, below:

Key Steps of Process According to One Embodiment

Step 1: Acquire camera images in different locations from camera supplier
Step 2: Improve Black-level and White-level by enhancement of tone-mapping
Step 3: Binarize imagery
Step 4: Based on target's dot size from imagery (calibratable value) define structuring element
Step 5: Perform image morphology
Step 6: Filter target and modify each of the other pixels to black in camera.
Step 7: Compile output images
Step 8: Continue the calibration process
Step 9: Determine intrinsic values
Step 10: Shift principal point (calibratable value)
Step 11: Flash camera with new intrinsic values FIG. 4 is an example image representation 4 prior to morphology, in accordance with an aspect of the disclosure. As may be seen, an appreciable amount of greyscale noise exists in the image, and it is unclear whether each of the generally round targets align properly with the HFOV and VFOV of the camera. As an example, is generally understood that the target in a calibrated image of a camera should be that of a circle since each of the targets 30 appear as such.

Figure 5:
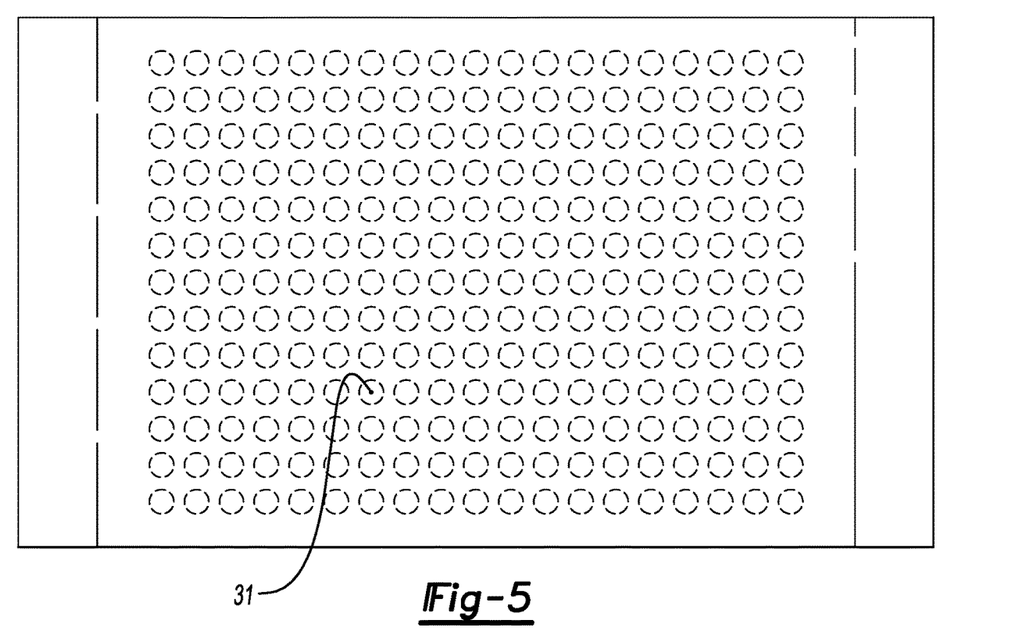
FIG. 5 is a representation of an image undergoing representation to modify the targets to their proper alignment in the image.

FIG. 5 is a representation 5 of an image undergoing representation to modify the targets to their proper alignment in the image. That is, FIG. 5 corresponds to FIG. 4 following the process of morphology, which aligns the circles according to the camera's VFOV and HFOV and shapes them properly into circles. In addition, per the ESF, the blur associated with FIG. 4 has been removed to provide a clear demarcation of the targets 31.

Figure 6:
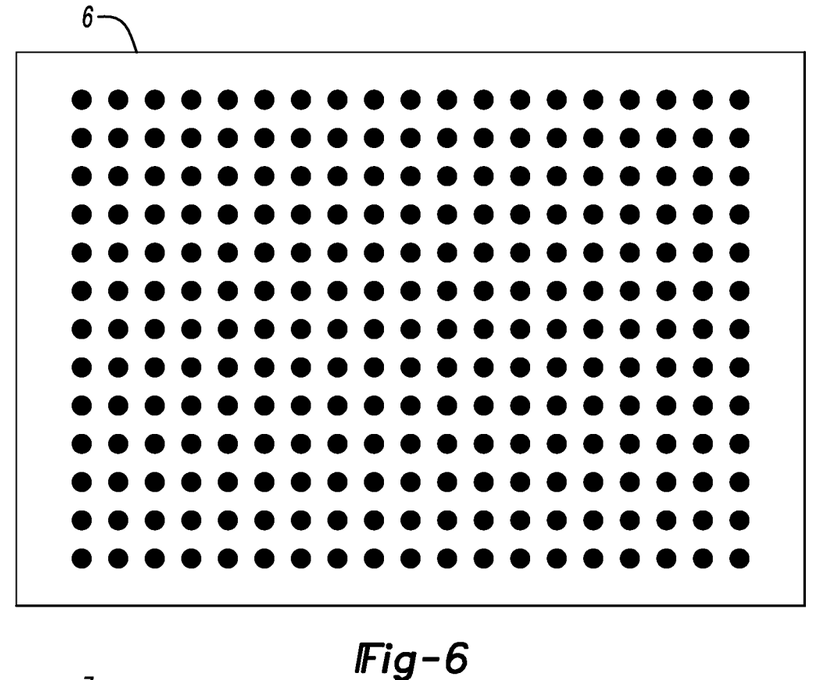
FIG. 6 is a representation of an image undergoing immediately prior to target enhancement.
Figure 7:
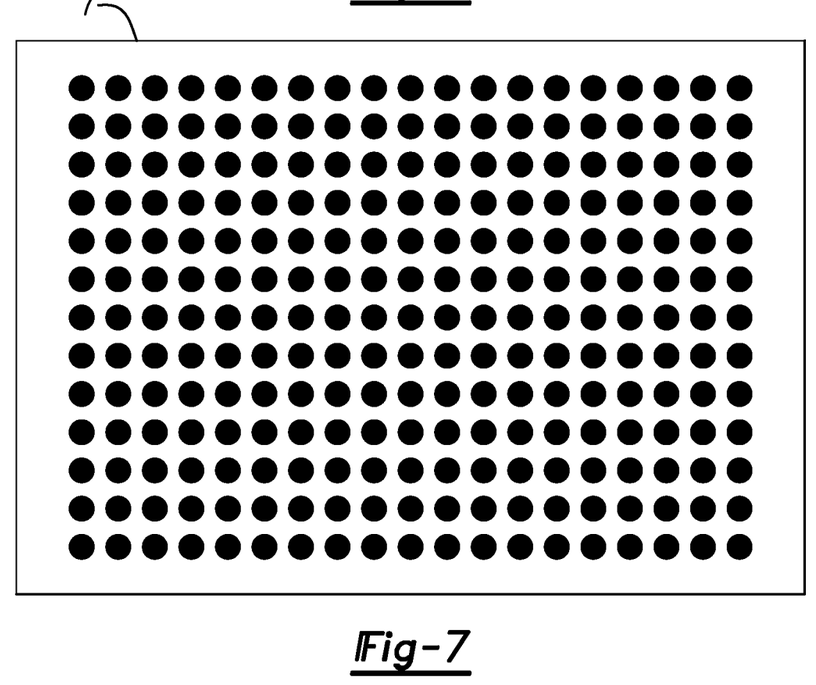
FIG. 7 is a representation of an image after target enhancement has been applied, with aligned morphed alerts.

FIG. 6 is a representation 6 of an image undergoing target enhancement. That is, the image of FIG. 6 represents that of FIG. 5, except that some of the targets are smaller than others, and uneven in shape. For example, the initial representation of target 30 appears as more of a "C than a circular shape. FIG. 7 is a representation of an image 7 after target enhancement has been applied, with aligned and resized morphed alerts. Each target is round, has a proper center point, and aligns with the camera's fields of view. The information in FIG. 7 may be applied to shift the initial values to calibrated values which, as noted above, may be flashed into the camera. It should also be noted that the interior of the filters have been converted to black to differentiate them from the values represented in FIGS. 4 and 5, which were more difficult to visualize due to the almost all-black nature of the images.

Figure 8:
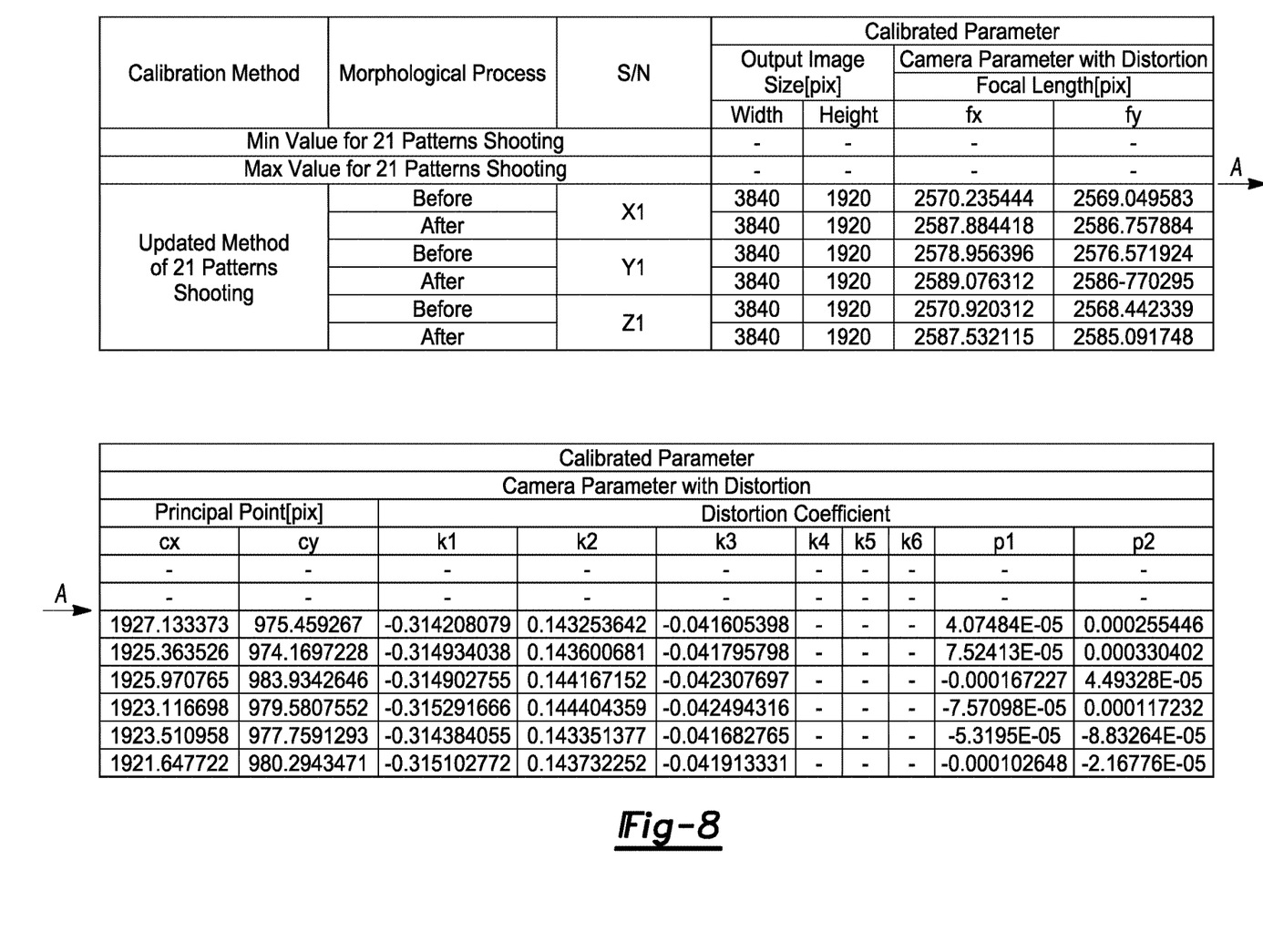
FIG. 8 is a table describing factors relevant to intrinsic calibration differences before and after morphology process.

FIG. 8 is a table describing factors relevant to intrinsic calibration differences before and after morphology process according to an embodiment of the disclosure. The upper table on FIG. 8 shows the calibration method (including number of images), the morphological values, identities of the chips, and a list of calibrated parameters including output image size, focal length, principal point, and distortion coefficients, as well as their magnitude of change from the initial to the final value. The lower table, which is shown by the letter "A" to represent a horizontal extension of the table, includes a list of the principal point and distortion coefficients of the three cameras.

Figure 9:
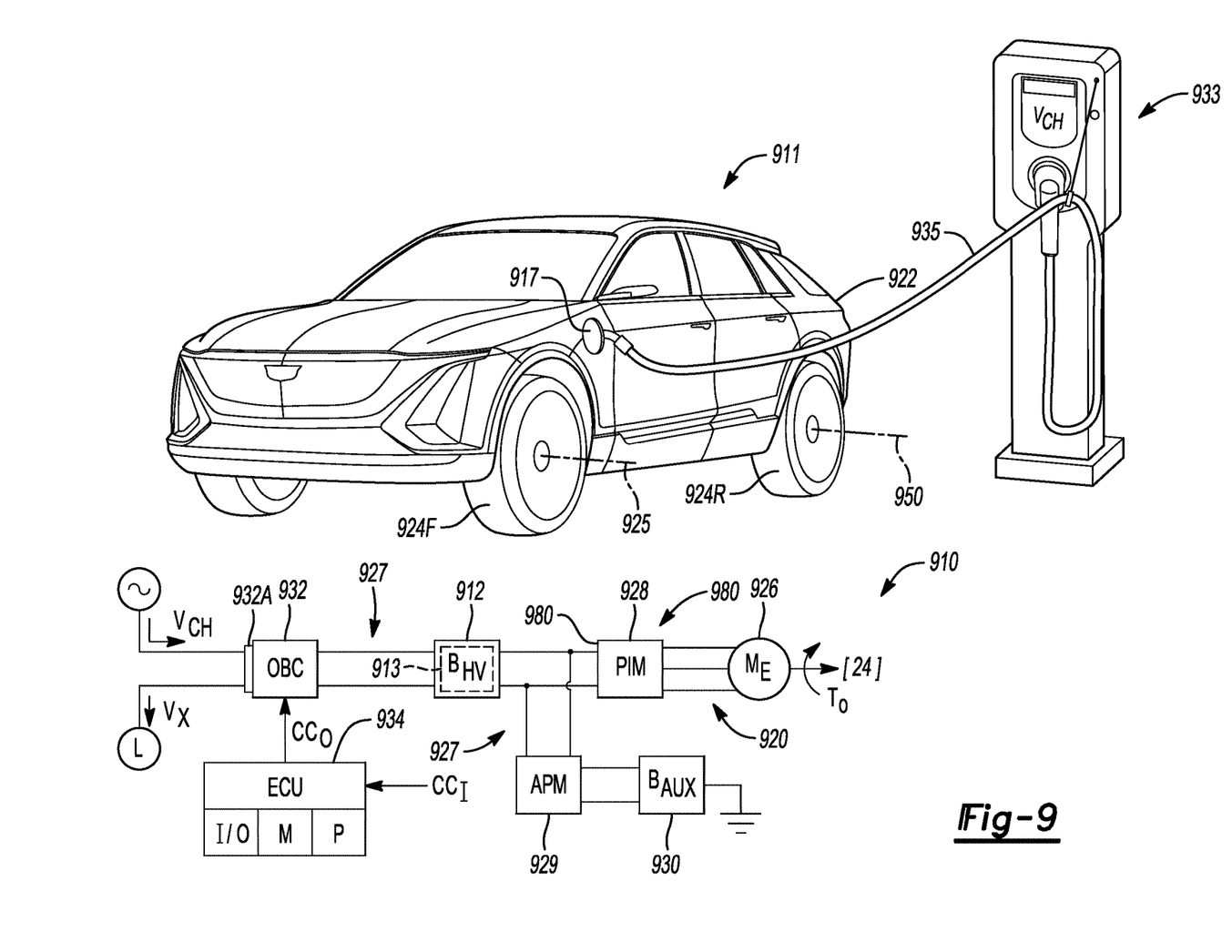
FIG. 9 is a plan view illustration of a vehicle and a battery system coupled to an Electronic Control Unit (ECU) for controlling aspects of the battery.
Figure 10:
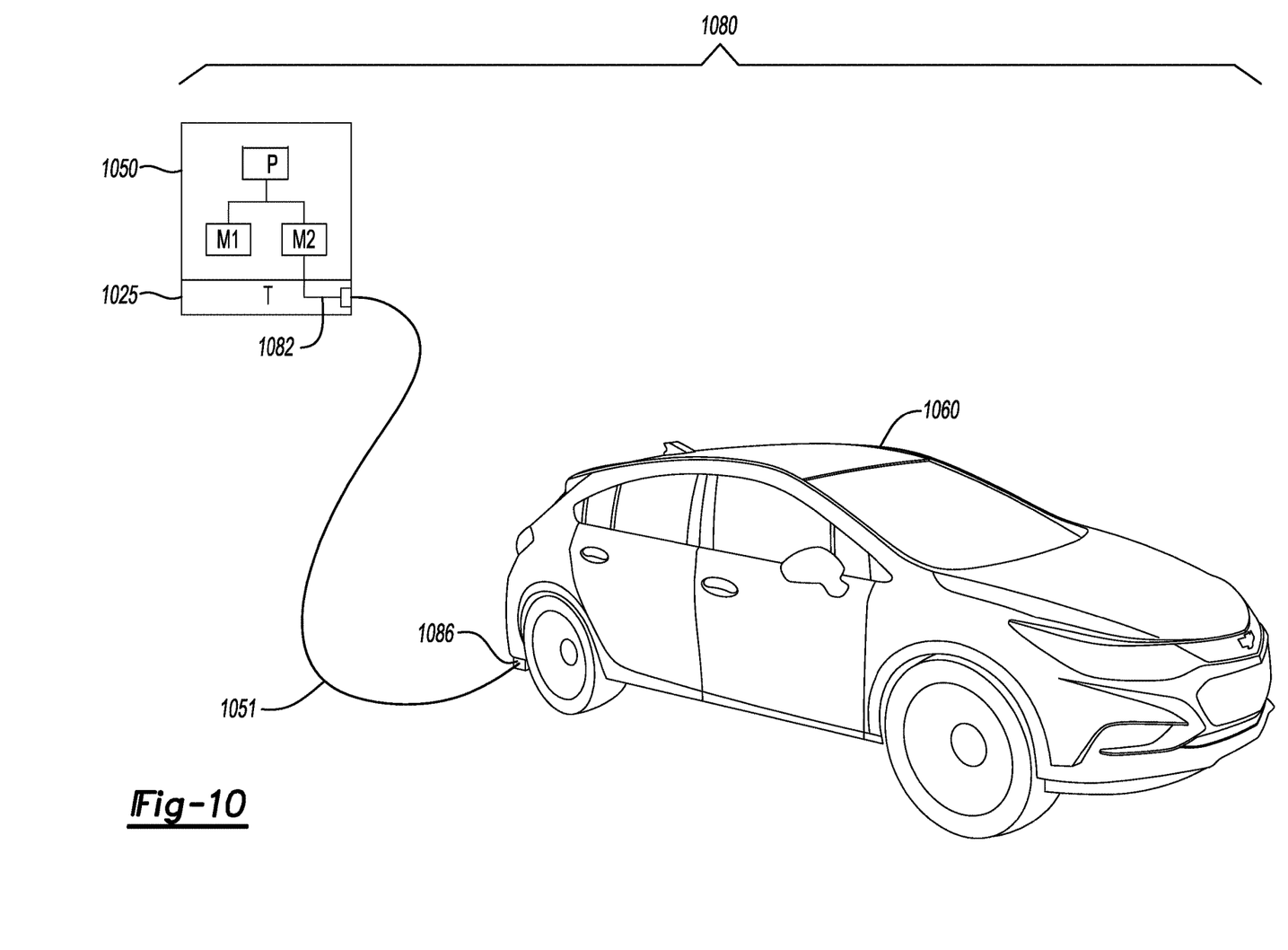
FIG. 10 is a plan view illustration of a designated location where intrinsic calibration for vehicle cameras is performed, including the hardware devices that may be used for the calibration.

FIG. 9 is a plan view illustration of a vehicle and a battery system coupled to an Electronic Control Unit (ECU) for controlling aspects of the battery. In the embodiment of FIG. 9, the calibration is performed by an ECU internal to the vehicle. Advantageously, whenever it is deemed that the calibration has been decayed for whatever reason, or even on power-on, the ECU may apply the principles of the present disclosure to recalibrate each camera on the vehicle. That is to say, calibration may be performed on the vehicle using the described on-board electronics.

While an electric vehicle is shown in FIG. 9, it will be appreciated that the disclosure is not so limited and that the internal calibration procedures may be performed by any vehicle having the appropriate programmed circuitry. While the above hysteresis models may apply to a number of different physical configurations, FIG. 9 shows one such example. FIG. 9 depicts an electrified powertrain system 910 having a high-voltage battery pack ($B_{HV}$) 912 for which SOC estimations may be made. In a non-limiting example, the battery pack 912 may be embodied as a high-capacity battery having a voltage capability of about 400-800 volts or more, with the actual voltage capability of the battery pack 912 provided based on a desired operating/SOC range, gross weight, and power rating of a load connected to the battery pack 912. In a possible construction, the battery pack 912 may be a propulsion battery pack generally composed of an array of lithium-ion or lithium-ion polymer rechargeable electrochemical battery cells, which may be a cylindrical battery cell. The present teachings may also be applied to prismatic battery cells, and possibly to pouch-style battery cells in possible configurations, and thus the cylindrical battery cell is exemplary without being limiting.

Although internal details of the battery cells in battery pack 912 are omitted for illustrative simplicity, those skilled in the art will appreciate that the battery cells contain within the cell cavity an electrolyte material, working electrodes in the form of a cathode and an anode, and a permeable separator (not shown), which are collectively enclosed inside an electrically-insulated can or casing. Grouped battery cells may be connected in series or parallel through use of an electrical interconnect board and related buses, sensing hardware, and power electronics (not shown but well understood in the art). An application-specific number of the battery cells in battery pack 912 may be arranged relative to the battery tray 913 in columns and rows. In a nominal "xyz" Cartesian reference frame, for instance, the battery tray 913 when viewed from above or below may have a length (x-dimension) and a width (y-direction), with a height (z-dimension) extending in an orthogonal direction away from the battery tray 913.

In a representative use case, the electrified powertrain system 910 may be used as part of an EV 911 or another mobile system. As shown, the EV 911 may be embodied as a battery electric vehicle, with the present teachings also being extendable to plug-in hybrid electric vehicles. Alternatively, the electrified powertrain system 910 may be used as part of another mobile system such as but not limited to a rail vehicle, aircraft, marine vessel, robot, farm equipment, etc. Likewise, the electrified powertrain system 910 may be stationary, such as in the case of a powerplant, hoist, drive belt, or conveyor system. Therefore, the electrified powertrain system 910 in the representative vehicular embodiment of FIG. 9 is intended to be illustrative of the present teachings and not limiting thereof.

The EV 911 shown in FIG. 9 includes a vehicle body 922 and road wheels 924F and 924R, with "F" and "R" indicating the respective front and rear positions. The road wheels 924F and 924R rotate about respective axes 925 and 950, with the road wheels 924F, the road wheels 924R, or both being powered by output torque (arrow $T_O$) from a rotary electric machine ($M_E$) 926 of the electrified powertrain system 910 as indicated by arrow [24]. The road wheels 924F and 924R thus represent a mechanical load in this embodiment, with other possible mechanical loads being possible in different host systems. To that end, the electrified powertrain system 910 includes a power inverter module (PIM) 928 and the high-voltage battery pack 912, e.g., a multi-cell lithium-ion propulsion battery or a battery having another application-suitable chemistry, both of which are arranged on a high-voltage DC bus 927. As appreciated in the art, the PIM 928 includes a DC side (980) and an alternating current (AC) side 920, with the latter being connected to individual phase windings (not shown) of the rotary electric machine 926 when the rotary electric machine 926 is configured as a polyphase rotary electric machine in the form of a propulsion or traction motor as shown.

The battery pack 912 of FIG. 9 in turn is connected to the DC side 980 of the PIM 928, such that a battery voltage from the battery pack 912 is provided to the power inverter module (PIM) 928 during propulsion modes of the EV 911. The PIM 928, or more precisely a set of semiconductor switches (not shown) residing therein, are controlled via pulse width modulation, pulse density modulation, or other suitable switching control techniques to invert a DC input voltage on the DC bus 927 into an AC output voltage suitable for energizing a high-voltage AC bus 920. High-speed switching of the resident semiconductor switches of the PIM 928 thus ultimately energizes the rotary electric machine 926 to thereby cause the rotary electric machine 926 to deliver the output torque (arrow $T_O$) as a motor drive torque to one or more of the road wheels 924F and/or 924R in another coupled mechanical load in other implementations.

Electrical components of the electrified powertrain system 910 may also include an accessory power module (APM) 929 and an auxiliary battery ($B_{AUX}$) 930. The APM 929 is configured as a DC-DC converter that is connected to the DC bus 927, as appreciated in the art. In operation, the APM 929 is capable, via internal switching and voltage transformation, of reducing a voltage level on the DC bus 927 to a lower level suitable for charging the auxiliary battery 930 and/or supplying low-voltage power to one or more accessories (not shown) such as lights, displays, etc. Thus, "high-voltage" refers to voltage levels well in excess of typical 12-15V low/auxiliary voltage levels, with 400V or more being an exemplary high-voltage level in some embodiments of the battery pack 912.

In some configurations, the electrified powertrain system 910 of FIG. 9 may include an on-board charger (OBC) 932 that is selectively connectable to an offboard charging station 933 via an input/output (I/O) block 932A during a charging mode during which the battery pack 912 is recharged by an AC charging voltage (VCH) from the offboard charging station 933. The I/O block 932 is connectable to a charging port 917 on the vehicle body 922. For instance, a charging cable 935 may be connected to the charging port 917, e.g., via an SAE J1772 connection. The electrified powertrain system 910 may also be configured to selectively receive a DC charging voltage in one or more embodiments as appreciated in the art, in which case the OBC 932 would be selectively bypassed using circuitry (not shown), e.g., that may be used to charge and/or discharge the battery pack 912 gradually for performing various functions, such as testing the SOC. The OBC 932 could also operate in different modes, including a charging mode during which the OBC 932 receives the AC charging voltage (VCH) from the offboard charging station 933 to recharge the battery pack 912 after a low charge indicator light displays on the dashboard, and a discharging mode, represented by arrow $V_X$, during which the OBC 932 offloads power from the battery pack 912 to an external AC electrical load (L). In this manner, the OBC 932 may embody a bidirectional charger.

Still referring to FIG. 9, the electrified powertrain system 910 may also include an electronic control unit (ECU) 934. The ECU 934 is operable for regulating ongoing operation of the electrified powertrain system 910 via transmission of electronic control signals (arrow $CC_O$). The ECU 934 does so in response to electronic input signals (arrow $CC_I$). Such input signals (arrow $CC_I$) may be actively communicated or passively detected in different embodiments, such that the ECU 934 is operable for determining a particular mode of operation. In response, the ECU 934 controls operation of the electrified powertrain system 910. Thus, the ECU and its accompanying components may act as a BMS for performing functions including estimating the SOC, etc., To that end, the ECU 934 may be equipped with one or more processors (P), e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock to provide the described SOC functionality in prior figures, as well as different functions identified by the CC input signal. The ECU 934 also includes an associated computer-readable storage medium, i.e., memory (M) inclusive of read only, programmable read only, random access, a hard drive, etc., whether resident, remote or a combination of both. Control routines, including code for executing the SOC model with hysteresis, are executed by the processor to monitor relevant inputs from sensing devices and other networked control modules (not shown), and to execute control and diagnostic routines to govern operation of the electrified powertrain system 910. The I/O circuits may be directly coupled to the ECU 934, along with memory M and one or more processors P for executing code that estimates SOC. In an aspect, the BMS system may collectively be realized as ECU 934, OBC 932 and bus 927. OBC 932 and bus 927 may be an apparatus within the BMS, or included as part of the BMS that is enabled to be connected to the outer terminals of battery pack 912 to perform the functions recited herein. In some implementations, the BMS may be coupled directly with the battery pack.

Note that EV 911 may, like other vehicles, include a dashboard implanted within or otherwise connected to the body of EV 911. The body houses a cabin where the driver and any occupants reside. The apparatus discussed above may include control signals to the dashboard and conversion circuitry to enable the driver to assess the SOC remaining based on an amount or percentage of charge remaining, an estimated time that the vehicle will die or imminently needs recharging, and other data. At least some of these aspects may be computed by the BMS, including ECU 934 and its associated processor P running code from memory M. Messages may be sent via the I/O circuit to other parts of the vehicle, via $CC_O$ or another connection not specifically shown.

In another embodiment, ECU 934 along with its I/O, memory and processor may additionally or alternatively be used to calibrate and recalibrate each of the cameras in the EV, or selected ones. In this case, the flow diagrams above may be run on the processor and the ECU 934 may be appropriately connected to carry out calibrations for each of the cameras. This may occur during suspected miscalibrations caused by force events, or it may simply be recalibrated every X times the driver turns on the EV 911. It should be noted again that another type of combustion based, or hybrid vehicle may be used in this embodiment. This embodiment also obviates the expensive and time-consuming need to implement calibrations independently for each of the vehicles at startup. ECU 934 may be coupled to each of the cameras via a hardwire or networked connection, or it may be connected to selected cameras.

FIG. 10 is a plan view illustration of a designated location 1080 where intrinsic calibration for vehicle cameras is performed, including the hardware devices that may be used for the calibration. Initially it should be noted that in many embodiments, the vehicles themselves are not used and the location 1080 is limited to the calibration hardware and the camera(s) that needs intrinsic calibration. However, in other embodiments where it is preferable to calibrate the cameras in serial, a configuration like the one in FIG. 10 may be preferable.

Here, vehicle 1060 includes a backup camera 1086, which happens to be already installed. Camera 1086 is connected via hardware connection 1051 (or a wireless connection) to computer 1050, which may be any kind of suitable computing device as discussed at length above. For example, computer 1050 may include a processor P, which is defined as one or more processors of the types described above, or of other types. P is connected to a first memory M1, which may be a DRAM or a flash memory for storing and quickly supplying code to the P for executing calibration measures. M2 may be a nonvolatile memory, such as a solid-state drive (SSD), a magnetic disk drive (MDD), a flash memory, or any other sufficient memory for storing calibration data received as a result of the computations and that may be read into the applicable camera via the correct connection. An internal bus 1082 may be used to connect to a transceiver 1025 that in turn is coupled to one such connection 1051 or network path for receiving calibration data and for storing shifted calibration data into the memory of the camera, or dedicated memory of the vehicle 1060 that stores memory for a particular camera.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. An apparatus for intrinsic calibration of a camera, comprising:
  memory for storing images and executable code; and
  an image processor coupled to the memory and configured to:
    acquire, for storage in the memory, plural images of a target captured by the camera at different locations;
    for each of the plural images:
      tone map the image to improve black and white image levels;
      binarize the tone-mapped image;
      define a structuring element based on a digital form of a shape of the target;
      perform morphology on the image to align and calibrate the structuring elements;
      filter the target and modify all other pixels to black;
      compile an output image including the filtered target;
      determine intrinsic values using the compiled output images;
      shift principal point upon intrinsic calibration using targets; and
      store new shifted principal points in the memory.

2. The apparatus of claim 1, wherein the image processor is configured to compute a kernel to define a structuring element for use in performing morphology, the structuring element being a digital form of a shape used for the target for use by the camera.

3. The apparatus of claim 2, wherein the image processor is configured to:
  identify a horizontal field-of-view (HFOV) and a vertical field of view (VFOV) based on imagery of the camera;
  locate target edges for storage in the memory;
  perform an edge spread function (ESF) using the target edges; and
  estimate a number of blur pixels based on the ESF.

4. The apparatus of claim 1, wherein the image processor is configured to use calibration differences before and after calibrating the structuring elements to include (1) a calibration method, (2) a morphological process, (3) output pixel sizes and heights, (4) focal lengths, (5) principal points, and (6) distortion coefficients.

5. The apparatus of claim 4, wherein calibration parameters for the calibration method include pixel size, focal length, principal point, and distortion coefficients.

6. The apparatus of claim 1, wherein the image processor is configured to add intrinsic calibration to incorporate a chronological morphological process into a target image count to enable a precise intrinsic calibration and to detect and monitor changes in the target image with detail.

7. A method for intrinsic calibration of a camera, comprising:

acquiring, by an image processor for storage in a memory, plural images of a target captured by the camera at different locations for a predetermined number of times;

acquiring a horizontal field-of-view (HFOV) and a vertical field-of-view (VFOV) of a lens of the camera based on imagery;

for each of the plural images:
tone mapping the image to improve black and white image levels;
binarizing the tone-mapped image;
defining a structuring element based on a digital form of a shape of the target;
performing morphology on the image to align and calibrate the structuring elements;
filtering the target imagery using the target at multiple locations;
compiling an output image including the filtered target;
determining intrinsic values using the compiled output images;
shifting principal point upon intrinsic calibration using targets; and
storing new shifted principal points in the memory.

8. The method of claim 7, further comprising computing a kernel to define a structuring element for use in performing morphology, the structuring element being a digital form of a shape used for the target for use by the camera.

9. The method of claim 8, further comprising:
identifying the horizontal field-of-view (HFOV) and the vertical field of view (VFOV) based on an imagery of the camera;
locating target edges for storage in the memory;
performing an edge spread function (ESF) using the located target edges; and
estimating a number of blur pixels based on the ESF.

10. The method of claim 7, further comprising:
using calibration differences before and after calibrating the structuring elements to include (1) a calibration method, (2) a morphological process, (3) output pixel sizes and heights, (4) focal lengths, (5) principal points, and (6) distortion coefficients.

11. The method of claim 10, wherein calibration parameters for the calibration method include pixel size, focal length, principal point, and distortion coefficients.

12. The method of claim 7, further comprising adding intrinsic calibration to incorporate a chronological morphological process into a target image count to enable a precise intrinsic calibration and to easily detect and monitor changes in the target image with detail.

13. A vehicle, comprising:
a vehicle body having a camera mounted on an exterior portion thereof;
a cabin housed within the vehicle body;
a dashboard near an interior front portion of the vehicle body;
a memory for storing images and executable code within the vehicle body;
an image processor coupled to the memory and configured to:
acquire, for storage in the memory, plural images of a target captured by the camera at different locations;
for each of the plural images:
tone map the image to improve black and white image levels;
binarize the tone-mapped image;
define a structuring element based on a digital form of a shape of the target;
perform morphology on the image to align and calibrate the structuring elements;
filter the target and modify all other pixels to black;
compile an output image including the filtered target;
determine intrinsic values using the compiled output images;
shift principal point upon intrinsic calibration using targets; and
store new shifted principal points in the memory.

14. The vehicle of claim 13, wherein the image processor is configured to compute a kernel to define a structuring element for use in performing morphology, the structuring element being a digital form of a shape used for the target for use by the camera.

15. The vehicle of claim 14, wherein the image processor is configured to:
identify a horizontal field-of-view (HFOV) and a vertical field of view (VFOV) based on imagery of the camera;
locate target edges for storage in the memory;
perform an edge spread function (ESF) using the located target edges; and
estimate a number of blur pixels based on the ESF.

16. The vehicle of claim 13, wherein the image processor is configured to use calibration differences before and after calibrating the structuring elements to include (1) a calibration method, (2) a morphological process, (3) output pixel sizes and heights, (4) focal lengths, (5) principal points, and (6) distortion coefficients.

17. The vehicle of claim 16, wherein calibration parameters include pixel size, focal length, principal point, and distortion coefficients.

18. The vehicle of claim 13, wherein the image processor is configured to add intrinsic calibration to incorporate a chronological morphological process into a target image count to enable a precise intrinsic calibration and to detect and monitor changes in the target image with high detail.

19. The vehicle of claim 13, wherein the image processor and the memory are part of an electronic control system (ECU) within the vehicle body.

20. The vehicle of claim 19, wherein the image processor is further configured to incorporate shifting principal points and focal points when the ECU is part of the vehicle body.

* * * * *